Sept. 23, 1952 J. VAN H. WHIPPLE ET AL 2,611,178
POCKET IMPLEMENT
Filed March 3, 1947 2 SHEETS—SHEET 1
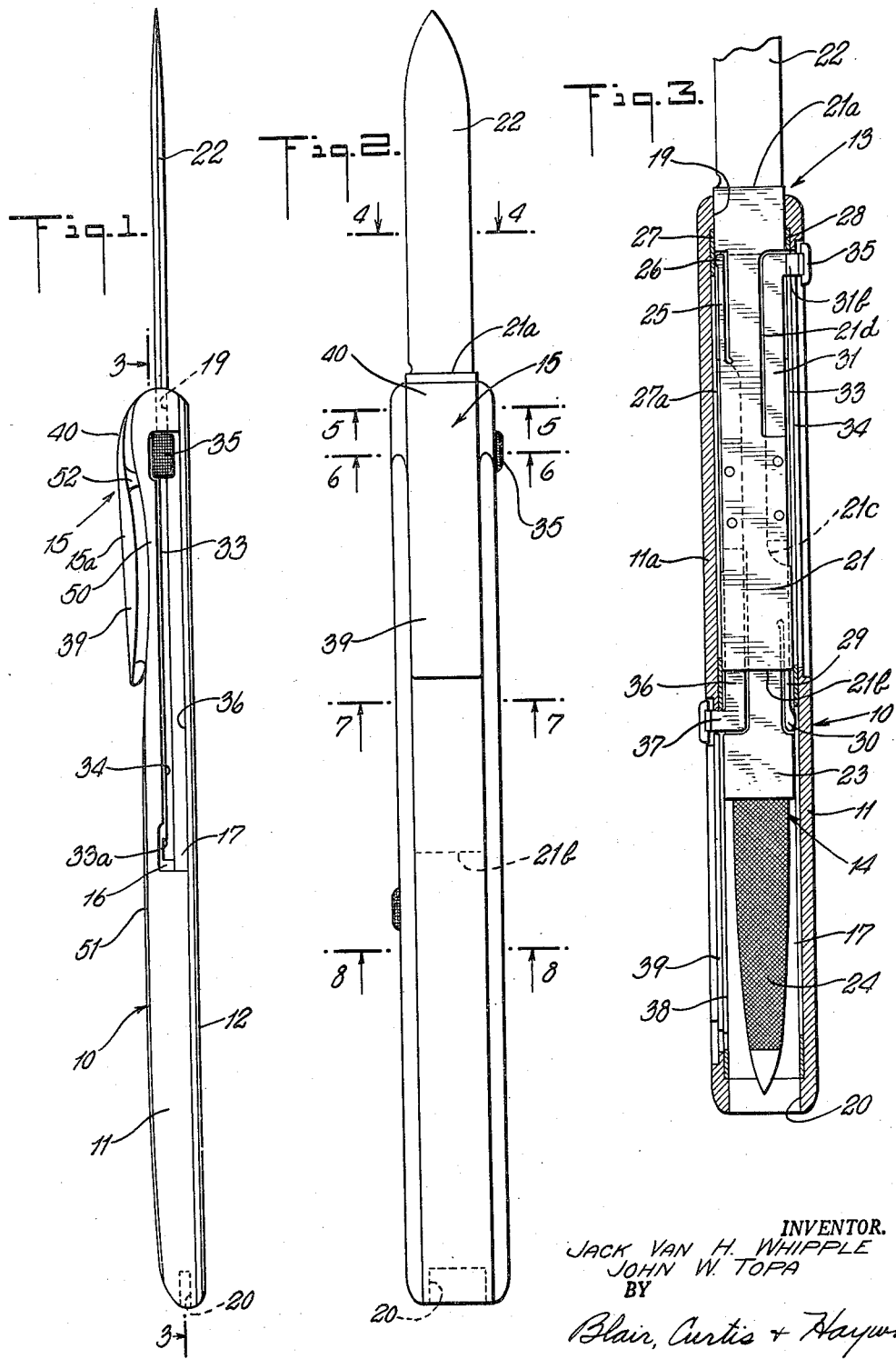
INVENTOR.
JACK VAN H. WHIPPLE
JOHN W. TOPA
BY
Blair, Curtis + Hayward
ATTORNEYS Sept. 23, 1952    J. VAN H. WHIPPLE ET AL    2,611,178
POCKET IMPLEMENT
Filed March 3, 1947    2 SHEETS—SHEET 2

INVENTOR.
JACK VAN H. WHIPPLE
JOHN W. TOPA
BY
Blair, Curtis & Hayward
ATTORNEYS

Patented Sept. 23, 1952

2,611,178

UNITED STATES PATENT OFFICE 2,611,178

POCKET IMPLEMENT

Jack Van H. Whipple, New York, and John W. Topa, Jamaica, N. Y., assignors to Burdette E. Bostwick, South Orange, N. J.

Application March 3, 1947, Serial No. 731,938

3 Claims. (Cl. 30—162)

This invention is directed to a pocket implement, and more particularly to an implement or tool adapted to be carried in or attached to a pocket of the user, and having one or more slidably extendable tool members. The implement hereinafter described has been illustratively disclosed as one including a slidable knife blade and a slidable nail file or the like, but it is to be understood that any type of tool suitable or desirable in an implement of this nature is contemplated. For purposes of simplicity and explanation, however, the implement will hereinafter be referred to as a slidable blade knife.

In accordance with one form of our invention, the implement comprises a two-bladed knife having a casing wherein the dual blades are slidably disposed so as to be individually extendable therefrom. Each blade includes a shank whose length approximates that of its attached blade, so that there is always engagement between substantial portions of the juxtaposed shanks of the two blades when one of the blades is fully extended from the casing. Furthermore, according to our invention, each shank has associated therewith a releasable locking element which extends through the casing for ready exterior accessibility by which the blades can be locked in extended or retracted positions. While the engagement between the blade shanks provides very substantial blade rigidity or stability relative to the casing, it is a further feature of our invention that each blade is provided with a wedging member which, when the blade is extended, engages the casing or the casing liner when such is provided, further to stabilize the blade, or rather, the shank.

Further, in accordance with our invention, we have provided a clip which is pivotally attached to the casing of the knife whereby it may be conveniently attached to a pocket-forming portion of a garment, and which, when the knife is attached in a pocket, closes on one of the casing end slots to preclude inadvertent extension of the blade.

The more specific details of our invention will be more easily understood by reference to the drawing, wherein Figure 1 is a side view of the knife with one of its blades extended;

Figure 3 is a staggered section taken along the line 3—3 of Figure 1;

Figure 7 is an enlarged section taken along the line 7—7 of Figure 2;

Similar reference characters refer to similar parts throughout the views of the drawing.

Figure 2:
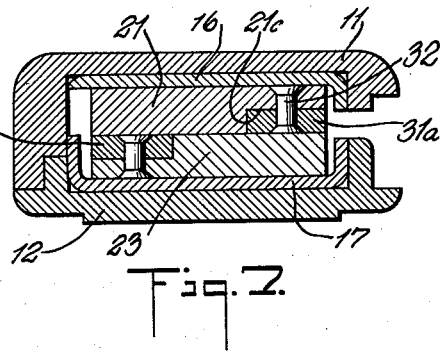
Figure 2 is a top plan view of the knife.
Figure 5:
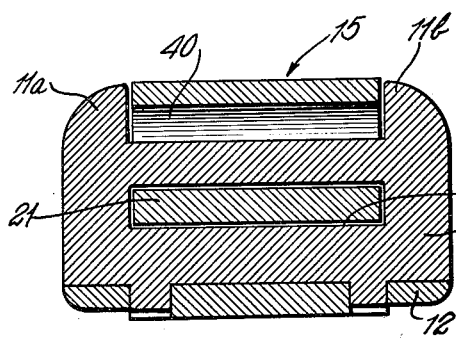
Figure 5 is an enlarged section taken along the line 5—5 of Figure 2.

Referring now to Figures 1 and 2 of the drawing, the knife case, which is generally indicated at 10, comprises a shell section 11 and bottom plate section 12, which may be die cast or molded from any suitable material, and which may be secured together in any suitable manner to form a hollow casing within which illustratively a pair of slidable blades, generally indicated at 13 and 14 (Figure 3) are mounted. Pivotally fastened to one end of casing 10 (Figure 1) is an attaching clip generally indicated at 15, by which the knife may be releasably attached to a pocket-forming portion of a garment such as a coat or vest.

Figure 4:
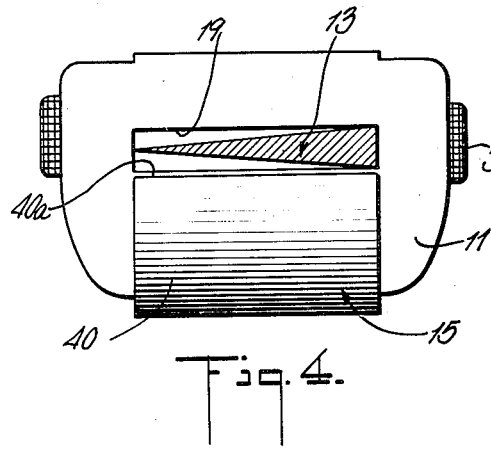
Figure 4 is an enlarged section taken along the line 4—4 of Figure 2.
Figure 8:
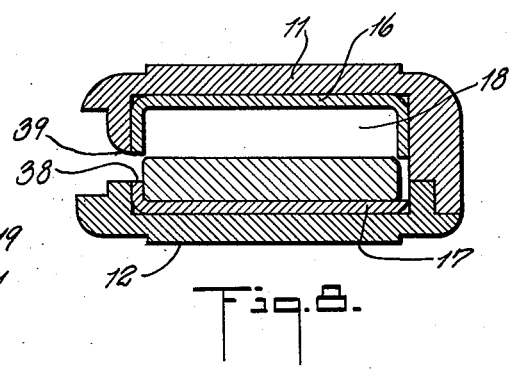
Figure 8 is an enlarged section taken along the line 8—8 of Figure 2.

Disposed within casing 10 is a liner which may comprise a pair of elongated trough-like members 16 and 17 (see Figures 3, 6, 8) which are preferably so proportioned as closely to fit within the cavity of casing 10 and to be retained therein by the casing sections 11 and 12. The liners 16 and 17 in turn define an elongated chamber 18, within which blades 13 and 14 (Figure 8) are slidably disposed. It should be noted, however, that under certain circumstances, and if desirable, this elongated chamber 18 may be formed by the casing sections 11 and 12 alone, as under such circumstances it may not be either necessary or desirable to provide the liner members 16 and 17. Where, however, the liner members are not provided, it follows that the casing sections 11 and 12 should be so dimensioned that the chamber 18 formed thereby very closely approximates in cross section the cross section of the juxtaposed blade shanks, so as to provide a snug but easily slidable fit between the blade shanks and the walls of the chamber, all as will be described in greater detail hereinafter. Whether or not, however, casing 10 is provided with liner elements 16 and 17, its section 11 is provided at each end with slots 19 and 20, through the former of which blade 13 may be extended, and through the latter of which blade 14 may be extended (see Figures 2, 3 and 4).

Blade 13 comprises a shank 21, and, illustratively, a knife blade 22, the shank 21 having a forward end 21a and a rear end 21b. As is more clearly shown in Figure 2, the distance between shank ends 21a and 21b is preferably at least as great as the length of knife blade 22, and under certain circumstances preferably exceeds the length of the knife blade. Blade 14 (Figure 3) also includes a shank 23 and, illustratively, a finger nail file 24, the length of shank 23, as in the case of shank 21, being at least as long as nail file 24. Furthermore, the length of each of shanks 21 and 23 preferably approximates one-half the length of casing 10, so that when one of the blades, e. g. blade 21, is extended with the other blade 23 retracted, a substantial portion of shank 21 overlies, and indeed is in engagement with a substantial portion of shank 23. This intimate engagement between shanks 21 and 23 is shown in Figure 7, and preferably the engaging surfaces of the shanks are ground, or, if desired, may be polished so as to reduce the frictional engagement therebetween when the blades are relatively moved. Also as shown in Figure 7, the outer surfaces of shanks 21 and 23 are respectively in engagement with the inner surfaces of liner members 16 and 17 and here again the sliding surfaces may be treated in any suitable manner to reduce friction to a minimum. Thus it follows that if the shanks and liner members are held to reasonably close manufacturing tolerances, the blade shanks will be securely supported within the knife casing, regardless of whether they are in their extended or retracted positions.

It is, of course, impractical to hold the blade shanks 21 and 23, the liner members 16 and 17, and as well the casing sections 11 and 12 to extremely fine tolerances, nor, indeed, should the blade shanks be so fitted between the liner members as to preclude easy extension and retraction. Hence a certain amount of looseness between the blades and the liner members should be provided to permit easy extension and retraction of the blades. It is, however, important that such looseness of the blades relative to the casing be removed when either blade is extended and locked in its extended position. In other words, it is desirable to take up the operating clearance between the blade and the liner or the blade and the casing when no liner is used, when the blade is fully extended.

To the end of taking up such operating clearance, blade shank 21 (Figure 3), for example, is preferably so formed as to be provided with an integral resilient finger 25 having a slightly enlarged end 26, the finger being sprung slightly so that when the shank is in its extended position shown, the finger end 26 presses against side wall 27 of liner 16. This, of course, has the effect of forcing the other side of shank 21 against the opposite wall 28 of liner member 16, so that the forward end of blade shank 21 fits quite snugly in the end of casing 10, finger 25 thus taking up the operating clearance between the blade shank and the casing. Of course, when the liner members are not used, finger end 26 bears directly against the inside of the casing section to accomplish the same result. Thus the engagement between finger end 26 and liner wall 27, on the one hand, or the casing section, on the other, where no liner is provided, is in the nature of a wedging action, and is always effective to wedge or seat the forward end of the shank tightly in the casing when the blade is extended regardless of an increase in the operating clearance by reason of wear from extended usage.

Thus it may be seen that by reason of the close sliding fit as between the blade shanks themselves and the blade shanks and the liner members, on the one hand, and the wedging action of the shank ends when extended, on the other hand, and also by reason of the fact that substantial portions of the two blade shanks overlie one another, even when one of the shanks is extended, a singularly stable condition results with little or no movement of the blade apparent, or, indeed, possible under the duress of use.

In order to permit easy sliding movement of a blade shank, e. g. shank 21, between extended and retracted positions, liner member wall 27 (Figure 3) is cut away as at 27a to provide clearance for end 26 of spring finger 25 for the major portion of its movement between extended and retracted positions. Thus the finger end 26 may ride along portion 27a without engaging the liner member or indeed the adjacent wall 11a of casing section 11. Of course, in the event that no liner is used, casing section wall 11a may be suitably recessed to provide the same clearance that is provided by cut-out portion 27a of the liner member.

Shank 23 of blade 14 is similarly provided with a resilient wedging finger 29 whose end 30 engages a wall portion of the other liner member in exactly the same manner as described with respect to wedging finger 25 and its end 26, thus to wedge blade 14 against movement relative to the casing when this blade is extended.

Provision for locking each of the blades in its extended or retracted position must, of course, be provided. To this end, shank 21, for example, is undercut as at 21c (see also Figure 7) and is recessed as at 21d (see Figures 3 and 6) to receive a resilient arm 31, one end 31a (Figure 7) of which is fastened to the undercut portion 21c of the shank as by rivets 32, and the other end 31b of which extends preferably at right angles to the body of the arm through an elongated slot 33 (Figures 1 and 3) of liner member 16. Casing section 11 is also slotted as at 34 to permit the extension of spring end 31b. At each end of slot 33 is a shoulder, such as shoulder 33a (Figure 1) behind which end 31b of the spring arm engages, thus to lock blade 21 in its extended or retracted position. It should be noted that spring arm 31 is pre-sprung so as always to bear against the left-hand edge of slot 33, as viewed in Figure 1, and accordingly springs into either of the notches at the ends of the slot and lies behind either shoulder, as referred to, when the blade is completely extended or retracted. To facilitate releasing the lock thus afforded, the end 31b of spring arm 31 has secured thereto a finger piece 35 by which the spring arm may be manually sprung to release its end 31b as desired. It might also be noted that casing section 11 (Figure 1) is rabbeted as at 36 to permit finger piece 35 to be at least partially countersunk in the casing side. The shank 23 (Figure 3) is also provided with a resilient locking arm 36 the end 37 of which extends through slots 38 and 39 on the other side of the liner and casing similar to slots 33 and 34 (see Figure 8).

It may accordingly be seen that either of blades 22 or 24 may be readily extended or retracted relative to the case by manually actuating either of the locking arms described in a direction substantially normal to the plane of the particular blade being moved. If desirable either or both of slots 33 and 38 may be notched intermediately of the ends thereof so providing a locked blade position or positions intermediate the fully extended or retracted positions.

Figure 6:
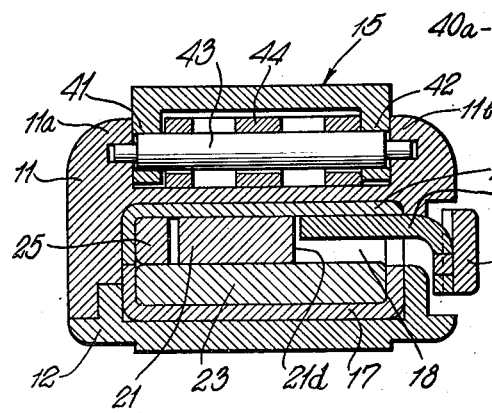
Figure 6 is an enlarged section taken along the line 6—6 of Figure 2.

As noted hereinabove our knife is equipped with a clip 15 (Figure 1) by which the knife may be attached to a garment. Clip 15 includes a gripping arm 39 and an operating arm 40 which lie on opposite sides of a pair of attaching ears 41 and 42 (Figure 6). These ears receive a pin 43 the ends of which are carried respectively in portions 11a and 11b thus to pivotally attach clip 15 to casing section 11.

Figure 9:
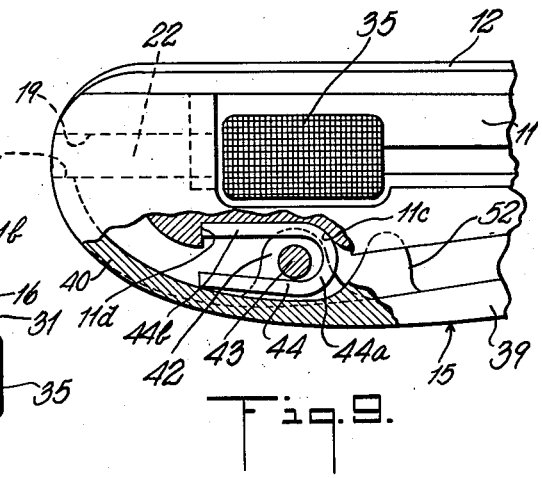
Figure 9 is an enlarged fragmentary side view of the clip end of the knife, portions of the clip and the adjacent casing and being broken away and shown in section.

To impart a counterclockwise (Figure 9) bias to clip 15, and thus to force its grip arm 39 toward the casing, a bent spring 44 is interposed between the clip and casing with its bight 44a looped around pin 43 and bearing against a radius 11c formed on casing section 11. The spring includes a plurality of upper arms 44b the ends of which abut a shoulder 11d formed on the casing section 11. The lower arms 44c of the spring bear against the operating arm 40 of the clip and thus impart to it the aforementioned bias.

It may now be seen that when it is desired to loosen the grip of clip 15 to facilitate detaching the knife from the garment, operating arm 40 may be pressed against the pressure of spring 44 thus to swing gripping arm 39 away from casing section 11 and accordingly free the clip from the garment.

Operating arm 40 of clip 15 is so proportioned that its extremity 40a lies adjacent casing slot 19 (Figure 4) when the knife is not attached to a garment by the clip. When, however, clip 15 is gripping a garment it will, of course, be swung somewhat clockwise (Figure 9) causing end 40a of arm 40 to enter slot 19 sufficiently to preclude inadvertent passage of blade 22 therethrough.

As is better shown in Figure 1 casing section 11a is hollowed out to form an elongated depression 50 within which arm 39 of clip 15 is received when the clip is detached from a garment. Also the clip is so proportioned that when its arm 39 is within depression 50 its outer surface 15a lies in substantially the same plane as the outer surface 51 of casing section 11. Thus the clip 15 is, in effect, countersunk within the casing and hence does not protrude from the casing in an unsightly manner. Furthermore the clip does not form an uncomfortable protuberance when the user holds the knife at the clip end thereof. As shown in Figure 2, the width of clip 15 preferably approximates that of the knife casing thus providing not only a wide gripping surface but also presenting a wide and flat outer surface that is conducive to the comfort of the user's hand when he is gripping the knife tightly.

To preclude improper attachment of the knife to a garment by clip 15, the under surface of the clip has a protruding lug 52 (Figures 1 and 9) formed thereon which acts as stop for the garment edge. Thus the edge of the garment is prevented from riding too near pin 43 where it might otherwise wedge the clip open.

While the above description has been directed to a pocket knife characterized by two slidable blades, it will, of course, be clear that if desirable but one blade may be provided. In such a case the liner members 16 and 17 are appropriately proportioned to reduce the cross sectional area of chamber 18, the casing sections 11 and 12 being similarly treated. Under such conditions the four sides of the blade shank are in close proximity to the respectively adjacent liner walls or inner casing walls while no liner is used, so as to be supported thereby when the blade is extended in the manner hereinabove described.

It may now be seen that we have provided a knife which attains the several objects set forth hereinabove in a thoroughly practical and efficient manner.

As many possible embodiments may be made of the above invention and as many changes might be made in the embodiments above set forth without departing from the scope thereof, it is to be understood that all matter hereinabove set forth or shown in the accompanying drawings is to be interpreted as illustrative only and not in a limiting sense.

We claim:

1. A pocket implement, comprising, in combination, a casing having a slot in one end thereof, an element slidably disposed within said casing, the length of said element being less than that of said casing, said element including a shank member and an implement member, the length of said shank member approximating that of said implement member and at all times being completely contained within said casing thereby to constitute a stable supporting connection between said casing and said implement member when said implement is extended from said casing through said end slot, means associated with said shank member and with said casing for releasably locking said slidable element against movement relative to said casing, and means operatively associated with said shank member and engageable with said casing when said element is slidably extended from said casing to wedge said shank member into substantially immovable relation with said casing laterally thereof.

2. A pocket implement according to claim 1 wherein the wedge means comprises a resilient element extending from said shank member with its free end riding in a clearance between the adjacent casing wall and said shank member but adapted to engage a portion of the casing wall adjacent the slotted end of the casing when said element is slidably extended from said casing.

3. A pocket implement according to claim 1 wherein said casing includes a liner within which said element is disposed, said wedge means comprising a resilient element extending from said shank member with its free end riding in a slot in the adjacent wall of said liner but adapted to engage a portion of the liner wall adjacent the slotted end of said casing when said element is slidably extended from said casing.

JACK VAN H. WHIPPLE.
JOHN W. TOPA.

REFERENCES CITED

The following references are of record in the file of this patent:

UNITED STATES PATENTS

| Number | Name | Date |
| --- | --- | --- |
| 373,580 | Boynton | Nov. 22, 1887 |
| 456,087 | Franklin | July 14, 1891 |
| 628,259 | Wheeler | July 4, 1899 |
| 1,449,408 | Hull | Mar. 27, 1923 |
| 1,697,974 | Funk | Jan. 8, 1929 |
| 1,906,573 | Gits | May 2, 1933 |
| 1,960,130 | Trubel | May 22, 1934 |
| 2,270,655 | Keeran | Jan. 20, 1942 |
| 2,400,679 | Buo | May 21, 1946 |
| 2,418,218 | Bauer et al. | Apr. 1, 1947 |